3,522,297
PROCESSES FOR THE PRODUCTION OF
ORGANIC SULFONATES
Charles J. Norton, Denver, Joe T. Kelly and Ned F. Seppi, Littleton, and Michael J. Reuter, Denver, Colo., assignors to Marathon Oil Company, Findlay, Ohio, a corporation of Ohio
No Drawing. Filed Jan. 14, 1966, Ser. No. 520,632
Int. Cl. C07c *139/12*
U.S. Cl. 260—513
10 Claims

ABSTRACT OF THE DISCLOSURE

The present invention comprises a process for the production of organic sulfonates comprising in combination the steps of preaerating organic compounds containing non-aromatic carbon-to-carbon unsaturation by intimately contacting such compounds with an oxygen-containing gas until the reaction mixture has titratable peroxide number of at least about 10 milliequivalents of titratable peroxide per kilogram of reaction mixture and thereafter reacting the resulting titratable peroxide-containing, unsaturated organic mixture with a water-soluble, non-interfering bisulfite and recovering the organic sulfonates thus formed.

---

The present invention relates to processes for the production of organic sulfonates and in particular relates to the production of such sulfonates from unsaturated hydrocarbons by first preaerating the unsaturated hydrocarbons with oxygen-containing gases and thereafter causing them to react with soluble non-interfering bisulfites.

Much work has been done in the search for a commercially economical process for the production of organic sulfonates by reaction of hydrocarbons with inorganic bisulfites. Such a process is especially desirable because of the high marketability of the products and the relatively low cost of the individual raw materials. Previous work has been patented in the United States as for example in U.S. Pats. 3,168,555, 3,150,169, 3,084,186, 2,504,411, and 2,318,031, and abroad as for example in British Pat. 995,376. However, to our knowledge, no process for the production of organic sulfonates by reaction of hydrocarbons with inorganic bisulfites has been found sufficiently economic to be practiced on a commercial scale.

The present invention provides high yields, excellent conversions, and high purity organic sulfonate products with excellent surfactant properties. In addition, the preferred products of the present invention exhibit a degree of biodegradability which is very superior to that exhibited by other types of the commercially available organic sulfonate detergents.

The preferred starting materials of the present invention consist only of the unsaturated hydrocarbons, inorganic bisulfites and oxygen containing gas. Use of catalysts and corresponding contamination problems and the addition of previously taught reaction initiators which are costly e.g. tertiary peroxides such as tert-butyl peroxide, cumene hydroperoxide and other free radical-initiating agents such as azobisisobutyronitrile can be avoided by use of the processes of the present invention.

The hydrocarbons for use in the present invention must contain unsaturation, either triple or more preferably double bonds. In general, acyclic olefins especially those having from about 6 to about 25 carbon atoms and most particularly those which are straight chain are preferred for the process of the present invention. While polyenes may be utilized, monounsaturated compounds are preferred. The most preferred compounds for the present invention will be the alpha (that is, terminal) olefins especially the normal alpha-olefins having from 6 to about 25 carbon atoms. Mixtures of the above hydrocarbons may be utilized, and it is a special feature of the present invention that it is relatively insensitive to the molecular weight or chain length of the hydrocarbon raw materials. That is, it permits the sulfonation of each of the various components of hydrocarbon mixtures to substantially the same degree.

Commercial pure hydrocarbons will, in general, be suitable for the process of the invention but contamination by compounds having labile hydrogens (and thus capable of forming relatively stable free radicals), e.g. compounds containing diallylically activated carbon-hydrogen bonds, should preferably be avoided. Such materials may be removed from reaction mixtures with acid treatment or by absorption with alumina, silica gel or other solid adsorbent.

The preaeration may be accomplished with an oxygen-containing gas mixture which does not interfere with the reactions of the present invention and which contains a substantial amount of oxygen, preferably at least about 5 percent and more preferably at least about 20 percent $O_2$. For reasons of economy, air is the most preferred oxygen-containing gas.

The air or other oxygen-containing gas must be intimately contacted with the hydrocarbons to be preaerated, preferably by sparging in the gas through a suitable diffuser, e.g. Alundum, sintered glass or perforated pipe. Normally, the agitation provided by the air will be sufficient, but in some cases, results can be improved by mechanical agitation, e.g. by stirring or shaking.

The temperature during preaeration, while not narrowly critical, must be above the freezing point of the hydrocarbons and should be sufficiently low as not to excessively deteriorate the peroxides generated during preaeration. In general, temperatures of from 15° to about 200° C., more preferably 50 to 175° C. and most preferably 100 to about 150° C. will be employed.

Likewise, pressure during the preaeration step is not critical and may range from about 0.1 to above 10,000 pounds per square inch absolute (p.s.i.a.) with pressures of about 10 to about 100 p.s.i.a. being more preferred, and pressures in the range from about 15 to about 30 p.s.i.a. being most preferred. It is important that the explosive ranges of hydrocarbons with oxygen be avoided during the preaeration. Explosive conditions can readily be detected by conventional explosimeters and corrected by varying the rate of flow of the oxygen-containing gas.

The preaeration may be conducted in the presence of solvents which are inert under the conditions of the reaction; but in general, undiluted hydrocarbon raw materials will be preferred.

The reaction times for the preaeration step will vary with the types of hydrocarbon raw materials employed and with the temperature, pressure and rate of flow of the oxygen-containing gas. In general, preferred reaction times will be from about 0.1 to about 100 hours with times of from 1–10 hours being more preferred. The preferred method for the determination of the completion of the necessary preaeration is a conventional peroxide number determination, e.g. an iodometric titration using sodium thiosulfate. The results are expressed as a titratable peroxide number, that is, as the number of milliequivalents per titrated 1 kg. sample of the preaeration reaction mixture.

For the practice of the present invention the end point peroxide number at which preaeration is discontinued should be at least about 10, more preferably from 75 to about 1,000 and most preferably from 100 to about 300. With specific raw materials there will generally be a break point in the range of roughly 300 to about 500 above which further increases in the peroxide number do not substantially enhance the bisulfite reaction which constitutes the second step of the invention. Where this occurs (as conveniently determined by routine experimentation) the preaerated olefins may optionally be cut back with unaerated olefins to yield an olefin mixture having a peroxide number in the above preferred ranges. However, in most instances no deleterious effect will be encountered from excess peroxide numbers. The preaeration step is illustrated by three procedures described in Examples I, II and III below.

The second step of the present invention is the reaction of the preaerated hydrocarbons with a soluble, non-interfering bisulfite, preferably an alkali metal bisulfite or ammonium bisulfite. By soluble and non-interfering is meant that the bisulfite must be sufficiently soluble in a reaction mixture to premit it to react with the preaerated hydrocarbons at a reasonable rate, and that it must not substantially interfere with the sulfonation reaction. Copper, especially, is to be avoided in the bisulfite addition step, as it has been found deleterious to the reaction.

Sodium bisulfite is the most preferred source of bisulfite ions. However, any non-interfering compound which forms bisulfite ions in a reaction mixture may be utilized. In addition to bisulfites, non-interfering pyrosulfites and metabisufites may be used as may other compounds which produce bisulfites in situ under the conditions of the reaction. Preferably from about 0.1 to about 10 moles of bisulfite are utilized per mole of unsaturation in the unsaturated hydrocarbons. Optimum results are generally obtained with from about 0.5 to about 5 moles of sodium bisulfite per mole of unsaturation in the hydrocarbons. In our process under most conditions and with most starting materials, nearly stoichiometric proportions of bisulfites can be employed with excellent yields. This is a verp practical economic advantage.

The addition reaction is preferably conducted in the presence of a solvent which is substantially non-reactive with the starting materials and end products. Suitable solvents include liquid hydrocarbons having suitable boiling points, esters, ethers, alcohols, glycols, amines, and aminoalcohols. Particularly preferred are low molecular weight alcohols, e.g., methanol, ethanol and isopropyl alcohol, because of their good solubilizing properties, ready availability, and convenient recovery. From 0.25 to about 10 volumes of solvent will generally be utilized per volume of unsaturated hydrocarbon reactant, and about 1:1 is the most preferred volume ratio.

In general some water is necessary to at least partially solubilize the sodium bisulfite, but since the hydrocarbons are only slightly soluble in water, it is usually preferable to use approximately 20% or more of the above mentioned organic solvents. Thus, the preferred reaction mixtures will contain from about 1 to about 75% water together with one of the above mentioned organic solvents, most preferably isopropyl alcohol.

A surfactant is preferably added to the reaction mixture in amounts of from 0.1 to about 5% by weight. While the presence of the surfactant is not necessary to the present invention, it does increase conversion rates significantly in most cases. Preferred surfactants are the conventional higher alkyl sulfonates, but a wide variety of cationic, non-ionic and anionic surfactants may be employed. The product of the reaction is most preferred. The temperature during the bisulfite-addition reaction is not narrowly critical but must be above the freezing point and below the point at which the solvent loss will become excessive or at which the reactants or products will undergo thermal decomposition. In general, temperatures of from 15 to about 200° C. will be preferred with temperatures of from 50 to 100° C. more preferred and temperatures of from 60 to about 80° C. being most preferred. Pressure during the bisulfite addition is also not narrowly critical and may be from 0.1 to above 10,000 p.s.i.a. with pressures of from 10 to about 100 p.s.i.a. being more preferred. The optimum pressure will in most instances be atmospheric or slightly above.

Catalysts are not necessary to the reactions of the present invention, but the co-catalytic system disclosed in co-pending application Ser. No. 486,137 of the same assignee filed Sept. 9, 1965, can be employed with the present invention. Some air sparged into the reaction mixture during the bisulfite addition has been found useful in most cases. (See Table 3, Examples 9 through 17.) The preferred air rates are from 0.01 to about 1,000; more preferred, 0.1 to 10 and most preferred, about 1 to about 2 volumes of air per minute based on the volume of olefin in the reaction mix. (Air as used herein includes equivalent oxygen in other admixtures with non-interfering gases and also equivalent amounts of pure oxygen.)

The bisulfite-addition reaction step is preferably conducted under vigorous agitation, e.g. mechanical stirring. The apparatus utilized for the bisulfite-addition reaction will vary with the temperatures and pressures selected but will in general be conventional autoclave or flow type of reactor.

Either or both of the steps of the process of the present invention may be conducted on either a batch or a flow basis and the preaeration and bisulfite addition can in most instances, be conducted in the same apparatus as sequential reactions.

The examples which follow serve to illustrate the invention but should not be taken as limiting it in any manner or degree. The invention is obviously subject to a wide variety of modifications and variations and all of these which would be apparent to a person skilled in the art are to be taken as being included within the claims which follow.

EXAMPLE I

Preaeration under flow conditions 500 ml. of olefin to be preaerated is placed in a 3-neck, 1-liter flask, (ST)24/40. A condenser cooled with chilled water and equipped with a drying tube is used to prevent escapement of entrained olefin vapors. A thermometer with a Therm-O-Watch temperature control device which has an oscillator head which senses a change in the capacitance due to changes in the mercury level in a thermometer to which the head is attached. (When the mercury level is too low, the sensing device operates a relay switch which causes the system to be heated. When the level is too high, the sensing device cuts off the electrical power to the heaters.) A rotameter with a $\frac{1}{16}$" diameter glass ball is used to regulate the air flow. Dry air is bubbled through the solution at 78 cc./min. (STP). The temperature is controlled at or near 110° C. The aeration is continued for about 30 hours to achieve a peroxide member of about 200–250 milliequivalents of peroxide per kilogram of olefin.

Results obtained in the preaeration of various olefins and mixtures by this procedure are summarized in Table 1.

TABLE 1.—PREAERATION OF OLEFINS UNDER FLOW CONDITIONS

Preaeration of hexadecene-1

| Conditions: | Peroxide number meq./kg.[3] |
|---|---|
| Hexadecene-1 [1] before alumina treatment | 12.5 |
| Hexadecene-1 after alumina [2] treatment | 0.7 |
| Hexadecene-1, aerated at 110° C., at dry air flow of 80 cc./min. for, hours— | |
| 0 | 11.2 |
| 2 | 71.7 |
| 4 | 94.7 |
| 6 | 126.8 |
| 6 | 160.9 |
| 7 | 204.0 |
| 14 | 378.4 |
| 24 | 270.5 |
| 27 | 279.8 |
| 30 | 225.7 |
| After 3 days storage at room temp. | 208.0 |
| After 13 days storage at room temp. | 201.0 |

Preaeration of octene-2

| | |
|---|---|
| Preaerated at reflux, 117° C. after 6 hours | 301.0 |

Preaeration of $C_{14}$–$C_{16}$ alpha-olefin fraction

| | |
|---|---|
| Feed | 0.96 |
| Preaerated at 110° C., 14–15 air flow setting: | |
| After 13.2 hours | 412.0 |
| After standing 2 days | 368.0 |
| After standing 6 days | 359.0 |

[1] Humphrey-Wilkinson 98% purity.
[2] Activated chromatographic grade reagent.
[3] Blank titration=0.0016 meq./kg.

EXAMPLE II

Preaeration using batch conditions

In a second preaeration procedure, 50 ml. of olefin was placed in a 250 ml. Fisher-Porter flask under a maintained atmosphere of 9±½ p.s.i.g. oxygen and heated with vigorous magnetic stirring at 130° C. for up to 2 hours. Resultant peroxide numbers were titrated as above and results are summarized in Table 2.

TABLE 2.—PREAERATION OF 1-HEXADECENE UNDER BATCH CONDITIONS

| Reaction number | Time, min. | $O_2$ uptake (peroxide number equivalent [1]) | Peroxide number |
|---|---|---|---|
| 84877 | 45 | 140 | 123 |
| [2] 84873 | 75 | 438 | 248 |
| 84883 | 75 | 543 | 291 |
| 84887 | 75 | 508 | 299 |
| [2] 84875 | 105 | 875 | 310 |
| 84879 | 105 | 1,050 | 398 |
| 84880 | 105 | 1,050 | 431 |
| 84881 | 105 | 1,033 | 425 |
| [2] 84878 | 120 | 1,120 | 399 |
| [2] 84876 | 135 | 1,260 | 280 |
| 84882 | 135 | 1,286 | 357 |
| 84884 | 135 | 1,540 | 364 |
| 84886 | 135 | 1,260 | 318 |
| 84870 | 210 | 1,208 | 223 |

[1] Peroxide number equivalent. The theoretical peroxide number that would be obtained if all of the $O_2$ absorbed in the system formed peroxides.
[2] These reactions were run before standardized reaction vessel cleaning procedure was rigorously standardized and therefore these reactions give generally lower $O_2$ uptake and peroxide numbers for given reaction time. Careful cleaning of reaction vessels speeds the preaeration process.

EXAMPLE III

Preaeration under batch conditions with vigorous stirring

In a third procedure using a confined oxygen atmosphere, a 1-liter stainless steel autoclave was equipped with a glass liner, Hastalloy stirrer, and a gold-plated cooling coil. 750 ml. of Chevron $C_{15}$–$C_{18}$ α-olefins was added to the system, sealed, then flushed with oxygen and heated to 120–130° at 300 r.p.m. stirring. The oxygen pressure was regulated at 10 p.s.i.g. Stirring was adjusted to 1500 r.p.m. for 2 hours. The oxygen and heater were turned off and the system cooled with stirring at 300 r.p.m. for 5–10 minutes. Peroxide numbers of 100–300 in the product mixtures were obtained under these conditions.

The bisulfite addition results obtained with the various peroxide-containing olefins are summarized in Table 3 below.

The general addition reaction procedure is described in detail in Example IV below.

EXAMPLE IV

Addition of sodium bisulfite to preaerated olefins 0.200 mole (20.81 g.) of sodium bisulfite is dissolved in a 150 ml. beaker containing 50 ml. of 70 ml. distilled water.[1] The solution is added to a 500 ml., three-neck Morton flask and the beaker rinsed with the remaining 20 ml. of water. 0.200 mole (e.g., 44.9 g. 1-hexadecene) is weighed in a tared 100 ml. graduated cylinder. The volume is noted for calculation of the volume percent conversion of the olefin. The olefin is poured into the Morton flask and the graduated cylinder rinsed with 70 ml. of isopropyl alcohol (IPA) which is added to the olefin-bisulfite-water mixture.

The Morton flask is equipped with a semi-micro condenser, a two-hole rubber stopper, size 4, with an 8 mm. porosity tube through which air is bubbled, and a thermocouple which rests in a 6 mm., 6-inch glass tube sealed at one end. The flask is heated with an electric mantle and the solution temperature is controlled at 70° C.±1° C. by a Wheelco controller set at 70° C. and a Variac set at 70 volts. (The temperature of the solution is checked by inserting a thermometer through the condenser.) The solution is stirred by a glass shaft with a Teflon blade attached to a Heller motor controlled at a speed of 3 on the 0–5000 r.p.m. shaft. The controller is turned on and the stirring started until the solution reaches temperature of 70° C. at which time the air flow is set through the rotameter at a scale of 8.[2] The reaction is continued for three hours at which time the controller and stirrer are turned off.

After cooling for a few minutes the clear solution is poured into a 1-liter separatory funnel. The flask is rinsed with several portions of water and 200–250 ml. of distilled water is added.

After standing for several hours (preferably overnight) the two phases are separated. (About 2–3% of the unreacted olefin which is emulsified in the aqueous sulfonate layer may be removed by two or three 60 ml. n-hexane extractions.)

The volume percent conversion is calculated as follows:

Vol. percent conversion =

$$\frac{\text{starting olefin volume} - \text{recovered olefin volume}}{\text{starting olefin volume}} \times 100$$

The sodium alkane sulfonate is purified by neutralizing the aqueous layer with base (NaOH), evaporation of the water-alcohol to about 300 ml. solution volume, cooling to 0° C. and filtering of the sulfonate crystals which are dried overnight in a vacuum oven at 80–85° C.

For comparison with the present invention, the cumene

[1] 70 ml. of distilled $H_2O$ is measured in a 100 ml. graduated cylinder. About 50 ml. is used to dissolve the $NaHSO_3$ in the beaker; the rest is used to rinse the aqueous bisulfite solution into the Morton flask. In a similar manner the 70 ml. of IPA is used to rinse out the graduate containing the preaerated α-olefin.
[2] A rotameter is used to control the air flow at a scale reading if 8 (23 cc./min. at 1 atm. and 70° F.).

hydroperoxide taught by the existing literature was tried under the reaction conditions of the present invention, using unpreaerated olefins and sodium bisulfite. Results are shown in Table 3, Examples 16 and 17.

TABLE 3.—PEROXIDE-INITIATED ADDITION OF SODIUM BISULFATE TO OLEFINS

| | Preaeration conditions and results | | | | | Bisulfate addition conditions | | | | Vol. percent of olefin converted to sulfonate |
|---|---|---|---|---|---|---|---|---|---|---|
| | | | | Peroxide number | | | | Bisulfite to olefin ratio | Air flow | |
| Olefin | | Temp., °C. | Time, hrs. | Original | After dilution [1] | Temp., °C. | Time, hrs. | | | |
| Examples: | | | | | | | | | | |
| 5 | 1-hexadecene | | | 0.25 | 0.25 | 30 | 48 | 0.1:0.05 | Open atm | 13.6 |
| A. With Preaeration by Procedure of Example I | | | | | | | | | | |
| 6 | 1-hexadecene | 110 | 30 | 128 | 128 | 30 | 48 | 0.1:0.05 | do | 47.8 |
| 7 | do | 110 | 30 | 128 | 128 | 40 | 18 | 0.1:0.05 | do | 100 |
| 8 | Chevron C₁₅-C₁₈ Internal Olefins:[2] | 110 | 30 | 429 | 429 | 36 | 18 | 0.1:0.1 | do | 12.1 |
| 9 | 1-hexadecene | 110 | 30 | 172 | 172 | 72 | 3 | 0.1:0.1 | 23 cc./minute | 55.2 |
| 10 | do | 110 | 30 | 172 | 172 | 70 | 3 | 0.2:0.2 | do | 86.8 |
| B. With Preaeration by Procedure of Example II | | | | | | | | | | |
| 11 | 1-hexadecene | 130 | 2.0 | 399 | 172 | 70 | 3 | 0.2:0.2 | do | 73.2 |
| 12 | do | 130 | 1.75 | 398 | 173 | 70 | 3 | 0.2:0.2 | do | 70.2 |
| 13 | do | 130 | 1.75 | 431 | 171 | 70 | 3 | 0.2:0.2 | do | 63.9 |
| C. With Preaeration by Procedure of Example III | | | | | | | | | | |
| 14 | Chevron C₁₅-C₁₈, α-Olefin | 120-30 | 2.0 | 179 | 179 | 70 | 3 | 0.2:0.2 | do | 63.3 |
| 15 | do | 120-30 | 2.0 | 179 | 179 | 70 | 3 | 0.3:0.2 | do | 82.2 |
| D. With Cumene Hydroperoxide Added | | | | | | | | | | |
| 16 | 1-hexadecene | | | | 172 | 70 | 3 | 0.2:0.2 | do | 21.3 |
| 17 | do | | | | [3] 29.1 | 70 | 3 | 0.2:0.2 | do | 22.5 |

[1] If peroxide number is same "after dilution" as original, no dilution was made; otherwise, dilution was made with olefin containing no peroxide to obtain reported peroxide number which was checked by titration.
[2] Chevron C₁₅-C₁₈ internal olefins are a mixture of internal linear olefins obtained by the isomerization of Chevron C₁₅-C₁₈ alpha-olefins.
[3] Equivalent to 0.003 mole cumene hydroperoxide per mole of 1-hexadecene, that is, in the optimum concentration ratio reported in U.S. Pat. 3,168,555, column 4, line 28.

What is claimed is:
1. A process for the production of organic sulfonates comprising in combination the steps of preaerating acyclic olefins containing about 6 to about 25 carbon atoms by intimately contacting such compounds with a free oxygen-containing gas until the reaction mixture has titratable peroxide number of from about 75 to 1000 milliequivalents of titratable peroxide per kilogram of reaction mixture and thereafter reacting the resulting titratable peroxide-containing, unsaturated organic mixture with a water-soluble, non-interfering bisulfite and recovering the organic sulfonates thus formed, and wherein the contact with the oxygen-containing gas is conducted at a temperature of from about 15° C. to about 200° C. and at a pressure of from about 0.1 atm. to about 1000 atm. and wherein the reaction with the soluble non-interfering bisulfite is conducted at a temperature of from 50° C. to about 175° C. at a pressure of from about 0.8 atm. to about 10 atm. in the presence of from 0.25 to about 10 volumes of an inert organic solvent per volume unsaturated organic compound, and wherein the soluble non-interfering bisulfite is selected from the group consisting of alkali metal bisulfite and ammonium bisulfite and compounds which yield one of the preceding under the conditions of the reaction.

2. The process of claim 1 wherein the unsaturated organic compounds consist essentially of olefins.

3. The process of claim 2 wherein the olefin consists essentially of monoolefins having from 6 to about 25 carbon atoms and wherein the pre-aeration is conducted at a temperature of from about 50° C. to about 175° C. and at a pressure of from about 0 p.s.i.a. to about 100 p.s.i.a. and wherein the bisulfite addition reaction is conducted at a temperature of from 50° C. to about 150° C. and at a pressure of from 0.8 atm. to about 10 atm. in the presence of from 0.25 to about 10 volumes of an inert organic solvent per volume of unsaturation in the olefin.

4. The process of claim 3 wherein the solvents are selected from the group consisting of water and alcohols which contain from 1 to about 6 carbon atoms.

5. The process of claim 4 wherein the solvent is water.

6. The process of claim 4 wherein the solvent is a mixture of water and methanol, ethanol, n-propanol or isopropanol.

7. The process of claim 1 wherein the olefin is a terminal olefin.

8. The process of claim 2 wherein the olefin is a terminal olefin.

9. The process of claim 3 wherein the olefin is a terminal olefin.

10. The process of claim 1 wherein during the bisulfite reaction step from about 0.01 to about 1000 volumes of air based on the volumes of olefin in the reaction mixture are brought into contact with the reaction mixture.

References Cited

UNITED STATES PATENTS

| | | |
|---|---|---|
| 2,318,036 | 5/1943 | Werntz. |
| 3,168,555 | 2/1965 | Clippinger et al. |
| 2,504,411 | 4/1950 | Harman. |
| 3,349,122 | 10/1967 | Segessemann. |
| 3,356,717 | 12/1967 | Furrow. |

FOREIGN PATENTS 701,809   1/1965   Canada.

OTHER REFERENCES

Stacy et al.: Organic Reactions, vol. 13, pp. 196–200 (1963).

Migrdichian: Organic Syntheses, vol. II (1960), p. 897, Reinhold Publishing Co., New York, N.Y.

Gilbert: Sulfonation and Related Reactions, pp. 148–151 (1965), Interscience Publishers, New York, N.Y.

DANIEL D. HORWITZ, Primary Examiner

PO-1050
(5/69)

UNITED STATES PATENT OFFICE
CERTIFICATE OF CORRECTION

Patent No. 3,522,297            Dated July 28, 1970

Inventor(s) Charles J. Norton, et al

It is certified that error appears in the above-identified patent and that said Letters Patent are hereby corrected as shown below:

Col. 3, line 33: "premit" should read: --permit--

Col. 3, line 42: "metabisufites" should read: --metabisulfites--

Col. 3, line 51: "verp" should read: --very--

Col. 4, line 70: "member" should read" --number--

Col. 5, line 14: "6" should read:--"5"--

Col. 6, line 75" "if 8" should read: --of 8--

SIGNED AND SEALED
DEC 15 1970

(SEAL)
Attest:

Edward M. Fletcher, Jr.
Attesting Officer

WILLIAM E. SCHUYLER, JR.
Commissioner of Patents